Aug. 20, 1935.  R. H. CHILTON  2,011,849
FLEXIBLE METAL FREEZING TRAY
Filed Dec. 14, 1931
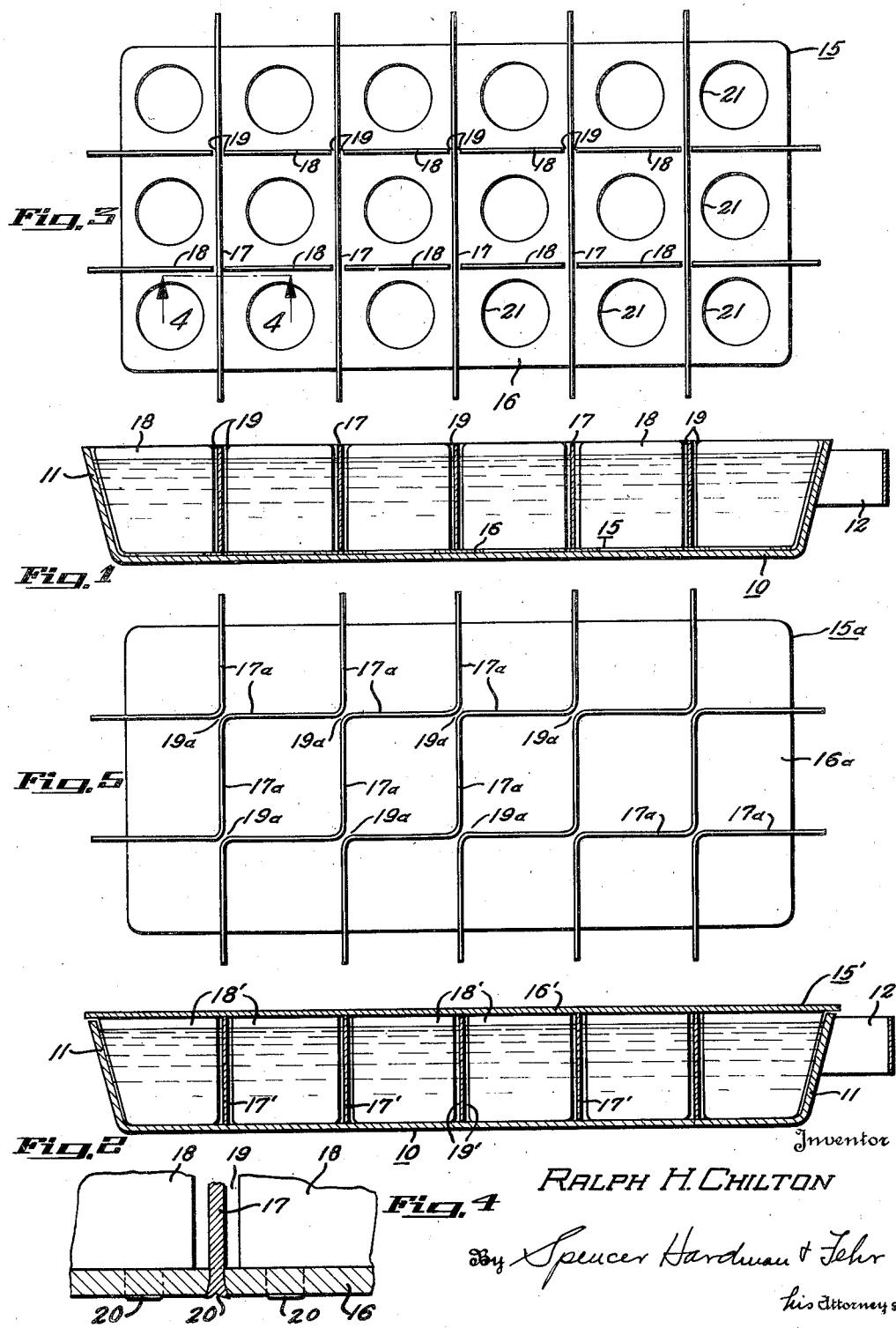
Inventor
RALPH H. CHILTON
By Spencer Hardman & Fehr
his Attorneys Patented Aug. 20, 1935

2,011,849

UNITED STATES PATENT OFFICE 2,011,849

FLEXIBLE METAL FREEZING TRAY

Ralph H. Chilton, Dayton, Ohio, assignor, by mesne assignments, to General Motors Corporation, Detroit, Mich., a corporation of Delaware Application December 14, 1931, Serial No. 580,864

10 Claims. (Cl. 62—108.5)

This invention relates to freezing trays and especially to such as are adapted for use with home mechanical refrigerators.

An object of this invention is to provide a simple and efficient form of freezing tray which has the advantages of rapidity of freezing and the ease with which the frozen ice blocks may be removed from the device.

A more specific object is to provide a freezing container pan and a removable flexible metal grid insertable therein and easily removable therefrom as a unit with the frozen ice blocks, said grid being then easily flexed to remove the ice blocks therefrom.

Another object is to provide a freezing tray with a removable grid having a false bottom which rests upon the tray bottom and thereby enhances rapidity of freezing by conducting heat from the grid partitions directly to the false bottom and thence to the tray bottom which ordinarily rests upon refrigerated metal support. The false bottom thus provides a relatively large area in direct contact with the refrigerated tray bottom and since said false bottom has good heat conductivity relation with the grid partitions said partitions will in effect have a large area in good heat conductivity relation with the tray bottom.

Another object is to provide a freezing container pan and a removable flexible metal grid insertable therein, said grid comprising a flexible metal cover plate adapted to be exposed to the cold air above the pan and having a series of partitions individually fixed thereto in good heat conductivity relation to enhance the rapidity of freezing and to permit easy flexing of the grid to facilitate the removal of the frozen ice blocks.

Further objects and advantages of the present invention will be apparent from the following description, reference being had to the accompanying drawing, wherein a preferred embodiment of one form of the present invention is clearly shown.

In the drawing:

Fig. 1 is a vertical longitudinal section through a freezing tray made according to this invention and shows the flexible metal grid having a false bottom inserted in place therein.

Fig. 2 is a similar view of a modified form of the invention wherein the flexible grid has a top or cover plate which lies above the water level and serves as a large area to conduct the heat from the vertical partitions to the cold air thereabove.

Fig. 3 is a plan view of the flexible metal grid used with the form shown in Fig. 1. This form of construction of grid may also be used with Fig. 2 as shown, the taper of the edges of the partitions of course being reversed to properly fit within the pan.

Fig. 4 is a detail view showing how the vertical partitions may be permanently fixed to the flexible metal plate in good heat conducting relation therewith, and is taken on line 4—4 of Fig. 3.

Fig. 5 is a view similar to Fig. 3 but shows a modified form of grid construction. This form of construction may be used with either Fig. 1 or Fig. 2.

Like or similar reference characters refer to like or similar parts throughout the drawing.

Numeral 10 designates the partitionless metal container pan whose side and end walls 11 preferably flare outwardly as shown in Figs. 1 and 2 to facilitate the twisting or distortion of pan 10 to remove the metal grid and the ice blocks contained therein as a unit therefrom. Pan 10 preferably has a suitable handle 12 fixed thereto at one or both ends which facilitate the handling of the tray and the twisting thereof to remove the grid and ice blocks as a unit.

The flexible metal grid 15 comprises a flexible resilient metal false bottom 16 having a series of transverse partitions 17 extending all the way across plate 16 and a series of short length longitudinal partitions 18, each of which stops short of the transverse partitions 17, by the small clearance gaps 19. Partitions 17 and 18 are permanently individually fixed to plate 16 by electric welding, brazing, or by staking such as shown in Fig. 4. When this staking method is used the partitions are provided with integral depending lugs 20, suitably spaced apart, and each lug 20 projects through a corresponding hole in plate 16 and is upset or riveted over on its under side, as clearly shown in Fig. 4. It will now be clear that the grid 15 shown in Fig. 3 will be quite flexible when flexed or bent backwards about its transverse center line as an axis, due to the fact that the transverse partitions 17 do not oppose such flexing at all and the short length partitions 18 will oppose such flexing only to a minor degree due to their short lengths and to the clearance gaps 19. Also it will be clear that grid 15 is also capable of a considerable twisting distortion in a diagonal direction due to the fact that the partitions 17 and 18 are separated and individually attached to plate 16. The above described distorting or flexing of the grid 15 is for the purpose of facilitating the removal of the ice blocks therefrom without it being necessary to hold the grid and its contents under water or otherwise melting the ice blocks free from the grid. By such flexing of grid 15, the ice blocks are all loosened from their confining metal walls and may then be easily dumped out by inverting the grid 15, or if desired the ice blocks may be individually pushed out with the fingers pressing thereupon through the holes 21 in plate 16.

In operation, the grid 15 is set within the pan 10 which is then filled with water to the desired level. This unit is then set within a freezing compartment of a refrigerator. Ordinarily the bottom of pan 10 will rest upon a refrigerated metal support or shelf, in which case most of the cooling will occur by heat transfer through the bottom of pan 10. The false bottom 16 rests in direct contact upon the pan bottom and thus the partitions 17 and 18 are in effect in direct contact over a large area with the bottom of pan 10 instead of having only their relatively narrow bottom edges in contact therewith as is the case with the present ordinary removable grids. Thus rapidity of freezing is greatly enhanced by the false bottom 16. After the ice is frozen the grid 15 and its frozen contents may be readily removed as a unit from the pan 10 by a twisting distortion of pan 10, which distortion is permitted by the resiliency of the sheet metal from which pan 10 is preferably made and by its shape, as described above. In some cases it may be preferable to allow pan 10 and its contents to set a minute or two in room temperature to permit a slight thawing of the film of ice between the bottom of pan 10 and false bottom 16 before distorting pan 10 to remove the grid 15 and its contents. Such thawing quickly takes place since said film of ice is very thin. After the removal of grid 15 and its contents as a unit from pan 10, the ice blocks are easily removed from grid 15 as described hereinabove.

In the form of the invention shown in Fig. 2, the functioning of the device and the removal of the ice blocks is substantially the same as above described for Fig. 1, with the exception that in Fig. 2, the metal plate 16' of the flexible grid 15' is fixed to the top edges of the partitions 17' and 18' and serves as a cover plate for the pan 10. Plate 16' is exposed over its entire area to the cold air above the pan 10 and thus serves to conduct heat away from partitions 17' and 18' since it is in good heat conducting relation with these partitions. Partitions 17' and 18' are thus in effect exposed to a refrigerated medium over a relatively large area similarly to the form shown in Fig. 1. Preferably the bottom edges of partitions 17' and 18' rest directly upon the bottom of pan 10 as shown in Fig. 2, and to some extent are cooled directly by the bottom of pan 10 but this contacting area is relatively small and hence of not great importance.

The grids of either Fig. 1 or Fig. 2 may be of the construction shown in Fig. 5. In this Fig. 5 the resilient flexible metal plate 16a has a series of zigzag flexible metal partitions 17a fixed thereto by electric welding, brazing, or staking, as described above in connection with Fig. 3. These zigzag partitions 17a are individually fixed to plate 16a and are spaced apart at their corners by the clearance spaces 19a for the purpose of increasing the flexibility of the grid 15a as a whole. Grid 15a may be easily distorted or bent backwards about a diagonal axis extending in the general direction of a zigzag partition 17a, or it may be easily distorted by twisting or bending backwards about a transverse axis, sufficiently to loosen the frozen ice cubes from the metal walls to facilitate their removal as described above in connection with Fig. 3. If grid 15a is used as a false bottom, as shown in Fig. 1, finger holes corresponding to holes 21 in Fig. 3 are preferably provided therein for the purpose of pushing out individual ice cubes after they have been freed from the metal walls by the distortion or flexing of grid 15a as above described.

While the form of embodiment of the present invention as herein disclosed, constitutes a preferred form, it is to be understood that other forms might be adopted, all coming within the scope of the claims which follow.

What is claimed is as follows.

1. A freezing device comprising: a metal container pan capable of such distortion as to loosen the frozen contents therefrom as a unit, and a removable flexible grid member insertable therein, said grid member having a plurality of partitions individually fixed to a flexible metal plate whereby said grid member may be easily flexed to remove the frozen ice blocks therefrom after its removal from said pan.

2. A freezing device comprising: a container pan and a removable flexible grid member insertable therein, said grid member being removable as a unit with the frozen contents and having a flexible metal false bottom and a series of separate zig-zag partitions individually fixed thereto along substantially oblique lines and defining ice block compartments.

3. A freezing device comprising: a container pan and a removable flexible grid member insertable therein, said grid member being removable as a unit with the frozen contents and having a flexible metal top plate and a series of partitions fixed thereto.

4. A freezing device comprising: a container pan and a removable flexible grid member insertable therein, said grid member being removable as a unit with the frozen contents and having a flexible metal top plate and a series of partitions fixed thereto in slightly spaced relation to enhance the flexibility of said grid member.

5. A freezing device comprising: a container pan and a removable flexible grid member insertable therein, said grid member being removable as a unit with the frozen contents and having a flexible metal top plate exposed to the cold air above said pan and having a series of partitions individually fixed thereto and adapted to rest upon the bottom of said pan.

6. A freezing device comprising: a container and a removable flexible grid member insertable therein, said grid member being removable as a unit with the frozen contents and having a flexible metal top plate and a series of flexible partitions attached thereto.

7. A freezing device comprising: a container and a removable flexible grid member insertable therein, said grid member being removable as a unit with the frozen contents and having a flexible metal top plate and a series of flexible partitions attached thereto in such manner as to facilitate the flexing of said grid as a whole after removal from said container.

8. A freezing device comprising: a container and a removable flexible grid member insertable therein, said grid member being removable as a unit with the frozen contents and having a flexible metal top plate and a series of flexible partitions attached thereto so as to form ice compartments but arranged to move slightly relative to each other when said flexible top plate is flexed.

9. A freezing device comprising: a container pan and a removable flexible metal grid member insertable therein, said grid member being removable as a unit with the frozen contents and comprising a flexible metal plate and a plurality of separate flexible metal partitions forming ice block compartments having interconnecting gates between said separate partitions.

10. A freezing device comprising an elongated container pan and a unitary flexible metal grid member insertable therein, said grid member being removable with the frozen contents and comprising an elongated flexible metal plate and a plurality of separate zig-zag partitions fixed thereto in separate relationship and forming a plurality of rows of ice block compartments, said zig-zag partitions extending obliquely across said elongated plate.

RALPH H. CHILTON.